Patented Sept. 5, 1950

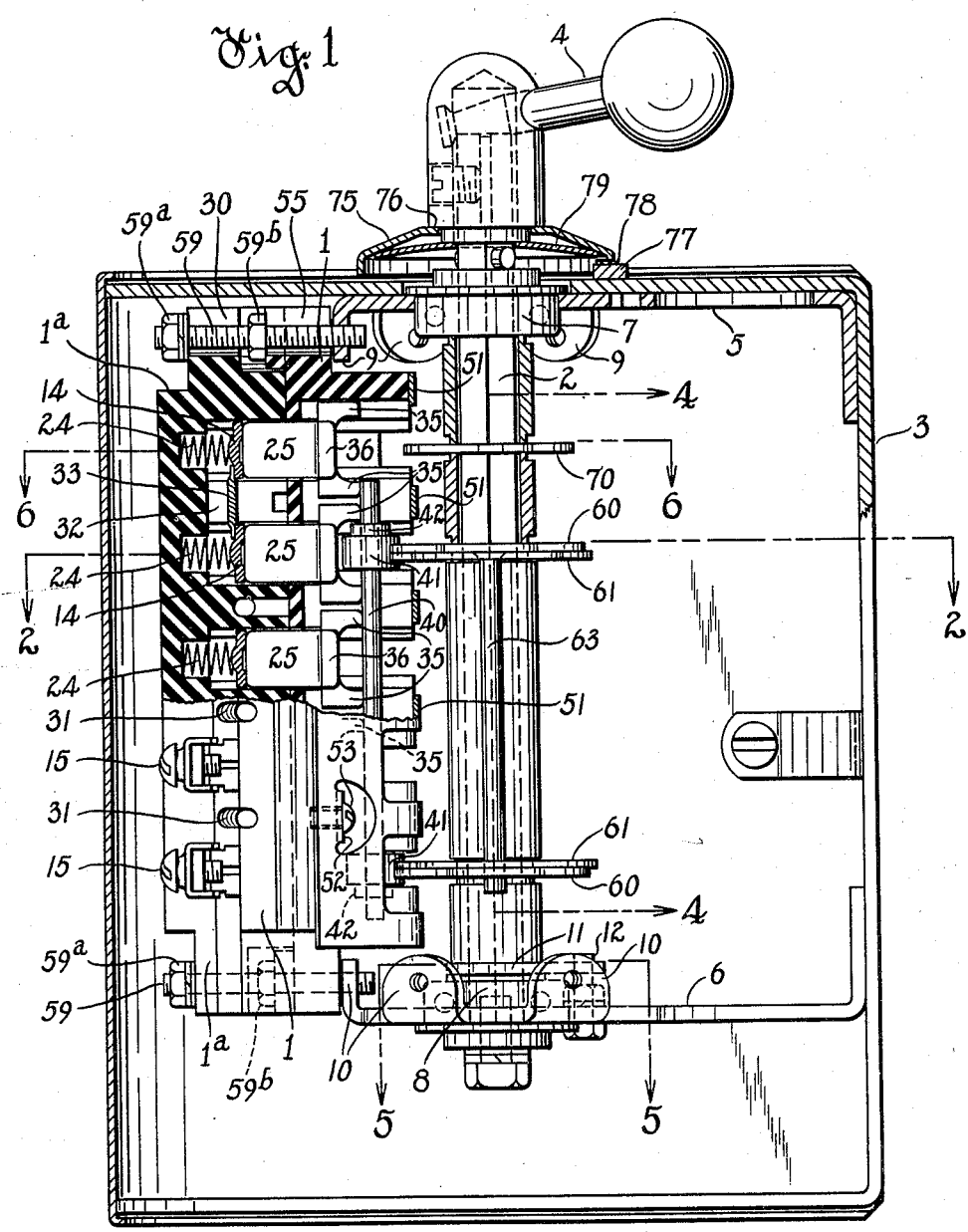

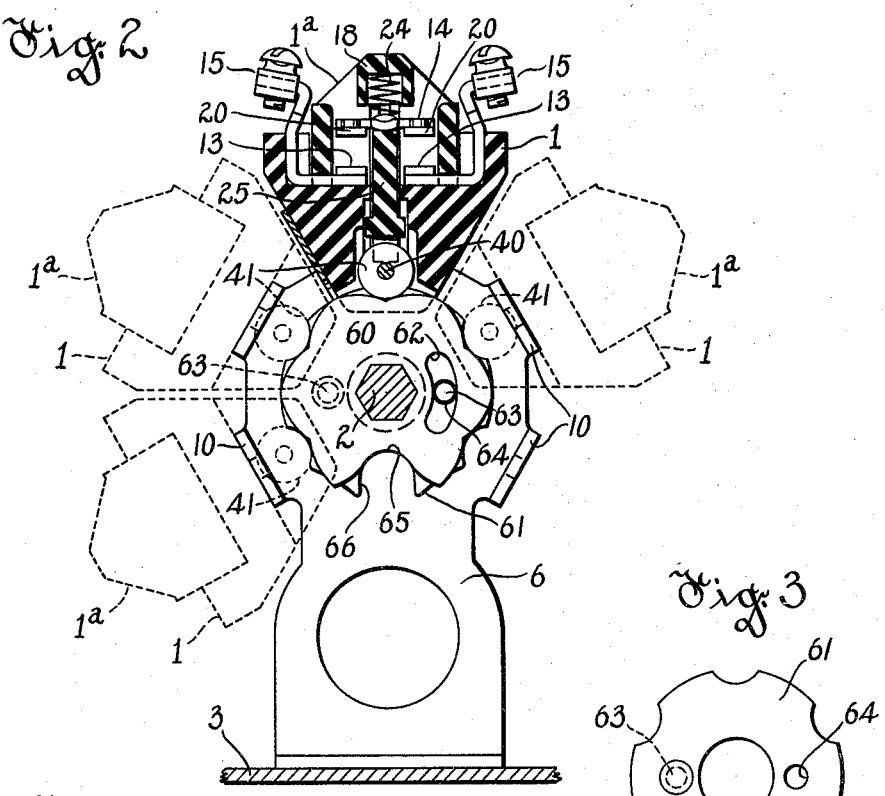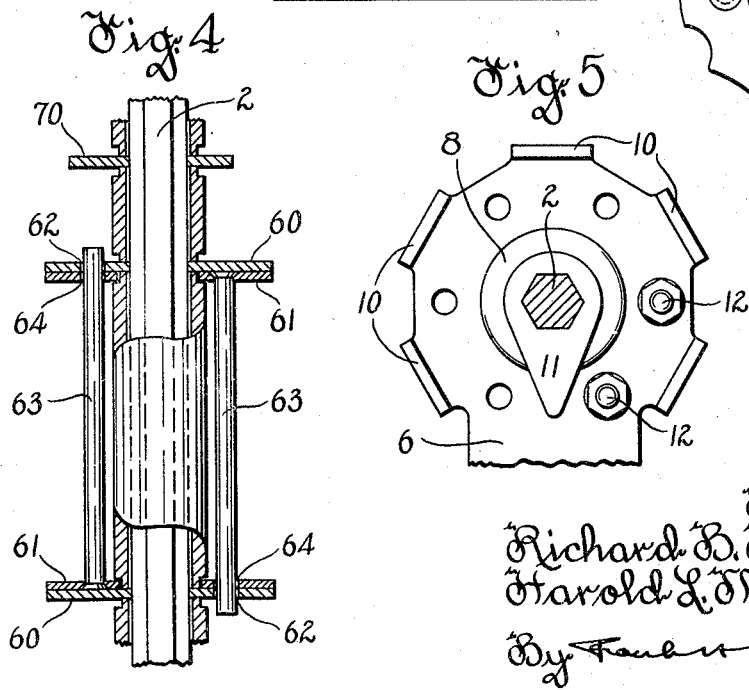

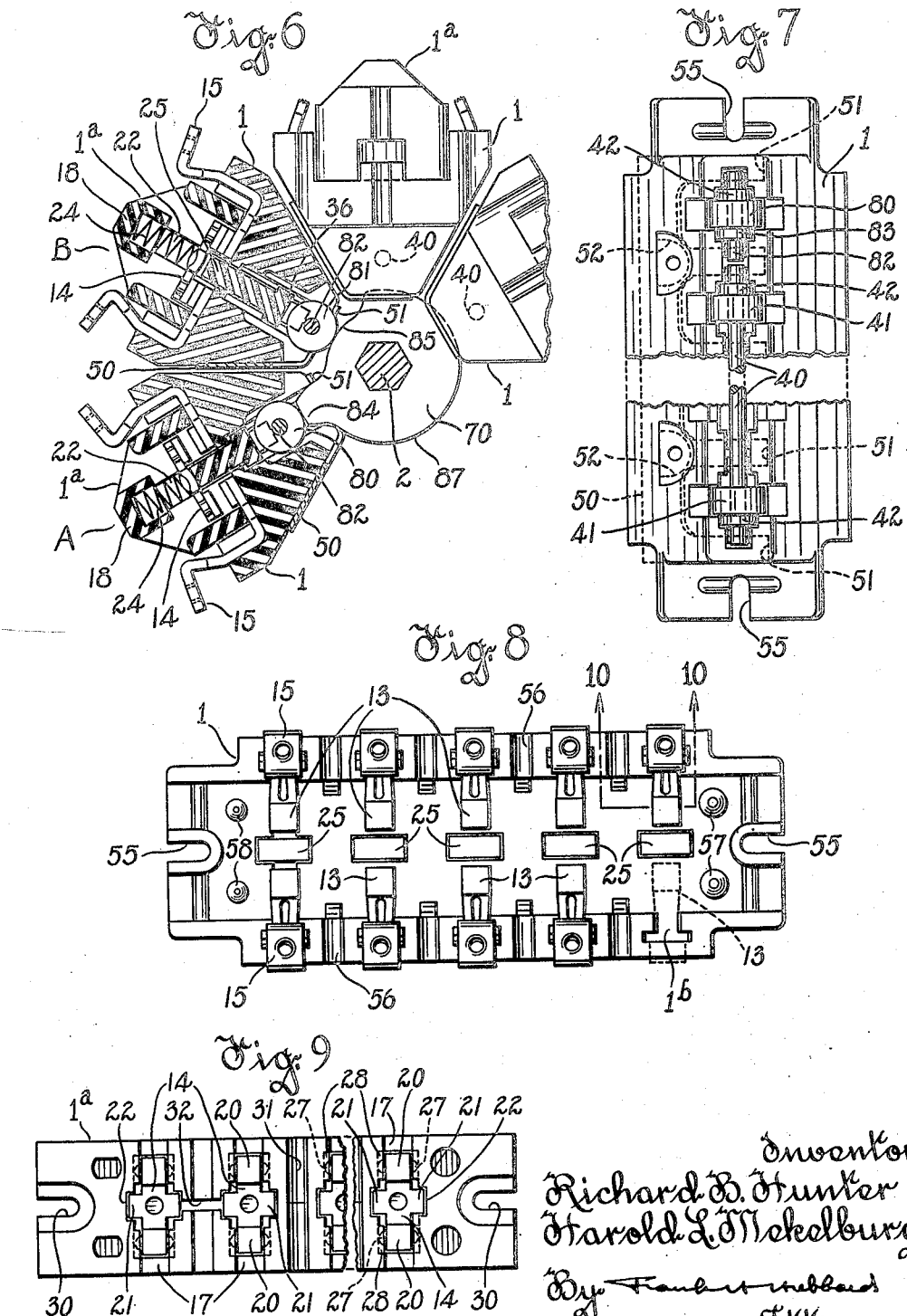

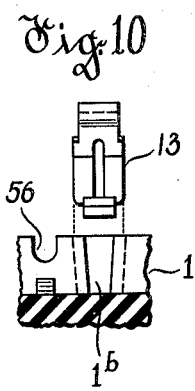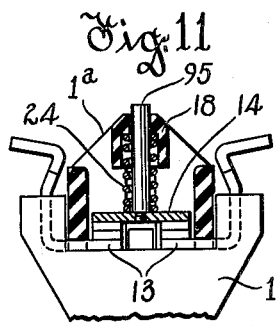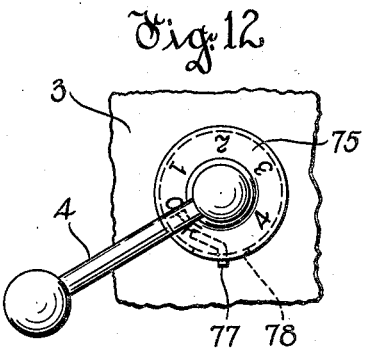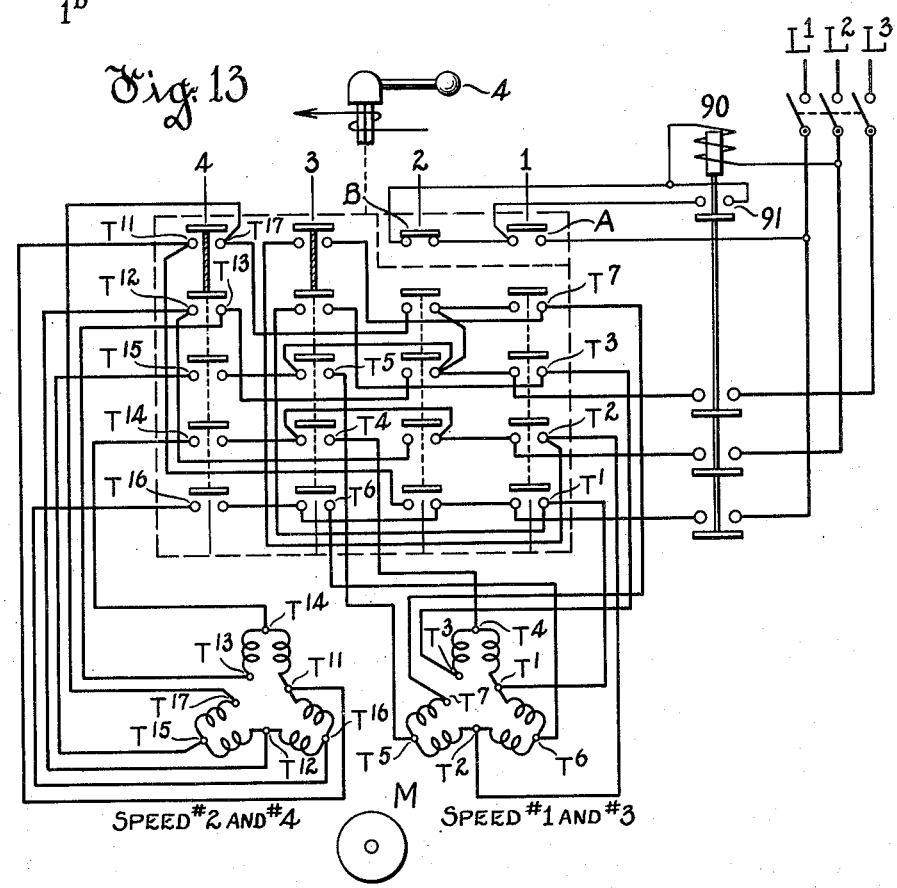
| SPEED | L1 | L2 | L3 | TOGETHER |
|---|---|---|---|---|
| #1 (LOW) | T1 | T2 | T3-T7 | NONE |
| #2 | T11 | T12 | T13-T17 | NONE |
| #3 | T6 | T4 | T5 | T1-T2-T3-T7 |
| #4 (HIGH) | T16 | T14 | T15 | T11-T12-T13-T17 |

2,521,519

UNITED STATES PATENT OFFICE 2,521,519

CIRCUIT CONTROLLER

Richard B. Hunter, Shorewood, and Harold L. Mekelburg, Milwaukee, Wis., assignors to Cutler-Hammer, Inc., Milwaukee, Wis., a corporation of Delaware Application December 4, 1944, Serial No. 566,463

25 Claims. (Cl. 200—16)

This invention relates to improvements in circuit controllers for electric motors and other translating devices and is particularly applicable to controllers of the drum type.

A desirable form of drum controller comprises switches biased to certain positions and operable against said bias by oscillatable cams carried by and operable through the medium of a shaft. The number of switches required of course varies with the circuit commutations desired, and the form and number of cams likewise vary with requirements. In some instances the switches are required to make and break the main circuit of the controlled motor or other translating device and yet it is important commercially to make such drums of small dimensions. Also such drums must meet other exacting requirements.

The present invention has among its objects to provide an improved drum of the character aforestated which will have better operating characteristics and greater flexibility for different uses than those heretobefore available.

Another object is to provide such a drum of simple, small and compact form, permitting of a substantial variation in number of switches employed without change in overall dimensions.

Another object is to provide a drum structure rendering the switch contacts easily and quickly accessible for inspection, repair and replacements.

Another object is to provide for mounting and demounting the switches in groups, and for incorporating the stationary contacts of all switches of a group in one self-contained assembly and all movable contacts of the same group of switches in a second self-contained assembly, which assemblies may be quickly and easily mounted in coacting relation and as easily removed for inspection and replacement of contacts.

Another object is to provide a drum having the characteristic of making a desired circuit commutation only after movement of an operating handle to an overthrow position and partial return thereof, with an indicating dial which directs proper manipulation for the desired circuit changes without confusion of the user by the aforementioned operating characteristic of the drum, and without need of the user even knowing the aforementioned operating charateristic.

Another object is to provide for such drums a cam operated switching means advantageous in saving space and in other respects, to control an electromagnetic main switch for low voltage protection and so-called intermediate point pickup.

Another object is to provide a drum construction advantageous for various applications and particularly for multispeed alternating current motors.

Various other objects and advantages of the invention will hereinafter appear.

An embodiment of the invention is illustrated in the accompanying drawings which will now be described, it being understood that the embodiment illustrated is susceptible of various modifications without departing from the scope of the appended claims.

In the drawings,

Figure 1 shows an enclosed drum controller with its casing and parts of its mechanism shown in section;

Fig. 2 is a transverse sectional view of the drum mechanism on line 2—2, Fig. 1;

Fig. 3 is a detail view of a cam of Figs. 1 and 2;

Fig. 4 shows partly in elevation but mainly in section part of the shaft and cam assembly of Fig. 1, the sectioning being along line 4—4 of Fig. 1;

Fig. 5 is a sectional view on line 5—5, Fig. 1;

Fig. 6 is a transverse sectional view of the drum mechanism on line 6—6, Fig. 1;

Fig. 7 is a bottom plan view of the tapered section of one of the switch blocks of Fig. 6;

Fig. 8 is a top plan view of the switch block shown in Fig. 7;

Fig. 9 is a bottom plan view of the upper section of a switch block of Fig. 6;

Fig. 10 is a fragmentary view on line 10—10, Fig. 8, of one of the switch blocks together with one of the contacts to be mounted thereon;

Fig. 11 shows one set of switch contacts provided with a wear measuring device;

Fig. 12 is an elevational view on a reduced scale of the operating handle and dial shown in Fig. 1, and Fig. 13 is a schematic and diagrammatic view depicting use of the drum controller illustrated, for control of a multispeed A. C. mtor.

Referring to Figs. 1 and 2, the drum comprises one to five switch blocks 1 arranged contiguous to and parallel with a rotatable shaft 2 and having operating connections with said shaft including cams hereinafter identified, such elements being supported within a housing 3 from which the shaft projects for operation by handle 4. The housing 3 which may be of any preferred form has therein in a fixed relation therewith a frame comprising end members 5 and 6 respectively carrying bearings 7 and 8 for the shaft 2, and respectively carrying ears 9 and 10 to which the one or more switch blocks are secured. As shown in Figs. 2 and 5, the frame member 6 has five ears 10 spaced equidistantly from the axis of the shaft and also from one another except in the case of the extreme ears of the series. The other frame member 5 has a like number and arrangement of ears 9 aligning with the ears 10 to provide five pairs of ears 9—10 to support five switch blocks if desired. As shown in Fig. 5 the shaft 2 carries an arm 11 to coact with one or two stops 12 (two being shown) to limit the shaft to the range of oscillation required according to the number of switch blocks employed.

The switch blocks preferably extend substantially the full length of the shaft within the housing to carry a plurality of switches, and preferably each is of the cross sectional form shown in Fig. 2, each being narrow and tapering in approach to the shaft 2 whereby said blocks may be closely assembled in an arc about said shaft. The switches carried by the blocks are of like construction and are preferably of the double break type, each as shown in Fig. 2 comprising a pair of stationary contacts 13 and a bridging contact 14, the stationary contacts 13 having extensions affording wiring terminals 15 external of the block. Each switch block comprises two separable sections, the tapered or base section to be referred to by the block reference numeral 1, and the second or upper section being designated as 1a. The section 1 has its upper side channeled longitudinally, as shown in Fig. 8, for seating therein a plurality of pairs of the aforementioned stationary contacts 13 and for receiving the upper block section 1a. The upper block section 1a, as shown in Fig. 9, has notches 17 therein to receive with close fit the shanks of contacts 13 and to permit said section 1a to fit snugly against the section 1, and section 1a has separate open recesses or chambers overlying the several pairs of contacts 13, said chambers or recesses accommodating the several bridging contacts 14 and guiding the latter in their movement relative to their respective stationary contacts 13.

The contact receiving recesses or chambers of block section 1a may be open only on the face of said section bearing on block section 1, or may also be open on the opposite side of section 1a, except for ribs 18, as shown in Figs. 2 and 6. In either case the section 1a provides for each set of switch contacts, to-wit a pair of contacts 13 and a bridging contact 14, a four-sided continuous wall encircling said contacts while the section 1 forms an end wall when the block sections are assembled. As shown in Fig. 9, the bridging contacts 14 comprise oblong plates having at adjacent opposite ends contact tips 20, said plate having intermediate laterally projecting lugs 21 while the block section 1a has its recesses so formed as to provide in opposed walls thereof slots 22 to receive the lugs 21 to guide the contacts 14 in their movement perpendicularly of the stationary contacts 13. Coil springs 24 seated in the ribs 18 of block section 1a bear upon the contacts 14 centrally thereof to bias them to engage their respective contacts 13 while plungers 25 reciprocably mounted in the other block section 1 engage contacts 14 centrally thereof and afford means by which contacts 14 may be individually moved against the bias of their springs for disengagement from contacts 13. Each block section 1a together with the contacts 14 and springs 24 therein preferably constitute a self-contained assembly and to this end the contacts 14 are locked against displacement from block section 1a. As shown in Fig. 9, this is accomplished by providing each contact 14 adjacent its opposite ends with oppositely projecting nibs 27 which overlie ledges 28 formed in block section 1a, which ledges must of course be so formed as to permit the contact tips of contacts 14 to engage contacts 13 before and after surface wear of the cooperating contact surfaces. The construction shown is such that while the ledges 28 prevent accidental release of the contacts 14 from the block section 1a under the pressure of springs 24 it is possible by tilting the contacts sidewise to provide for withdrawal thereof from the block section 1a at will. Thus such self-contained assembly may be assembled and disassembled quickly and easily by mere manipulation of the parts thereof without need of tools. The block section 1a has at opposite ends slots 30 to receive mounting bolts, and preferably said block section has through conductor slots 31 located between adjacent switch receiving recesses or chambers. In the particular block section shown in Fig. 9 there is a recess or slot 32 connecting the last two switch receiving chambers at the left hand end of the block to enable electrical connection of the bridging contacts of such chambers for purposes hereinafter set forth, the electrical connection being made as shown in Fig. 1 by a pigtail 33 in slot 32.

The block section 1, as aforestated, has the plungers 25 reciprocably mounted therein, and referring to Fig. 8 it will be seen that such plungers are in cross section oblong, being in length and width like that transverse part of contacts 14 comprising the oppositely projecting lugs 21. Accordingly as the plungers are positions in block 1 to register with said parts of contacts 14 said plungers will when used to move the contacts, enter and slide into the guide slots 22 of block section 1a. In so doing each plunger will subdivide the respective recesses or chambers in block section 1a into separate and complete chambers for the two pairs of cooperating contact surfaces of the respective switch, thus isolating each of said pairs of cooperating surfaces. Moreover as will be observed from Figs. 2 and 9, the openings in block section 1 through which the plungers project are closely fitted by said plungers and hence each switch recess in block section 1a will remain substantially closed at one end by block section 1. Each plunger not only has a close fit with block section 1 adjacent the surface of the latter but it is otherwise guided in its movement.

As shown in Fig. 1 which shows the broader sides of the plunger 25, each plunger has laterally and downwardly projecting portions 35, the upper parts of which together with ribs 36 (Figs. 1 and 2) extending along and projecting from the broader faces of the plunger afford the plunger a part in cross section having at its four corners right angle notches. On the other hand, the base section 1 has its receiving recesses formed to match such parts of the plungers with a close fit continuing throughout the operating range of movement of each plunger whereby the latter is held to a rectilinear path without possibility of appreciable lateral shifting or tilting. The projecting portions 35 of each plunger provide for the plunger a forked base, the spaced ends of the fork resting upon a rod 40 located in a slot in the block section 1, such slot extending longitudinally of the block and into the block sufficiently to afford the rod clearance for moving the plungers engaged therewith to open their respective normally closed switches.

The rod 40 as shown in Fig. 1 is of a length to be engaged by all plungers carried by the block. More particularly the rod 40 has resting thereon the ends of the forks of all plungers except in the case of the top plunger of Fig. 1 which has only one side of the fork engaging the rod. The rod 40 has loosely mounted thereon spaced rollers 41 each to be in alignment with a plunger 25, clearance therefor being afforded by the aforedescribed forked formation of the base of each plunger. The rollers 41 are provided for engagement with the operating cams hereinafter set forth, and as will be understood are lifted by the cams to lift the rod 40, the walls of the recesses in the block section 1 adjacent such rollers being formed to afford said rollers the necessary clearance. While the walls of block section 1 adjacent the rollers afford guides therefor and hence for the rod 40 also, it is preferable to independently guide the rollers 41 whereby they may be relieved of pressure against the walls of the block section. This may be accomplished by providing on the rod 40 the smaller separate rollers 42, Figs. 1 and 7, which may be either loose on the rod or fixed thereto, and which are preferably of dimensions to fit between and to be guided by certain of the walls of the recesses in block section 1 which serve also as plunger guides. The length of the rod 40 of course may be varied and in the drum shown two different lengths of such rod are desired, the length shown in Fig. 1 being the greater of the two. In the switch shown in Fig. 7 the rod 40 is only used as an operating medium for four switches and is shorter than the rod of Fig. 1. Where rod 40 is used to operate five switches as in Fig. 1, but without need of limitation of its length, said rod is preferably lengthened to engage both feet of the forked base of the end switch.

In practice it is desirable to have the block section 1 together with the contact plungers, rod and rollers constitute a self-contained assembly and to this end the contacts 13 are secured to the block section 1 and the rod 40 is locked against displacement from the block section. Preferably the contacts 13 are secured to the block section by wedging of parts thereof in recesses in the block whereby they may be attached and withdrawn without need of tools. Preferably the shanks of contacts 13 are slotted longitudinally thereof, the slots therein extending from the contact tips as shown in Fig. 8 throughout the perpendicularly bent portion of the shank as shown in Fig. 10, thereby rendering the shank compressible under lateral pressure. Also the shank of each contact 13 is preferably of increased width in its aforementioned perpendicular position, as best shown in Fig. 10, to wedge into a slightly tapered recess 1ᵇ in the block section 1. As shown in Figs. 8 and 10 the recess 1ᵇ has a front slot of less width than the width of the recess, to receive the portion of the contact shank carrying the contact tip, and as will be apparent the shoulders afforded by the slot further secure the enlarged portion of the shank in its recess. Preferably the rod 40 is locked in the block section 1 by the means best shown in Figs. 6 and 7. This means comprises a plate 50 secured against one of the sloping side walls of the block section and having angularly disposed fingers 51 extending across the slot in the block section provided to receive the rod and rollers. These fingers, as shown by dotted lines in Fig. 7, are spaced to give clearance for the rollers 41 and their actuating cams, such fingers being shown in cross section in Fig. 1. For attachment of the plate 50 the same is provided with angularly disposed ears 52. Figs. 1 and 7, fitting in notches provided in block section 1 and secured therein by screws 53. The block section 1 has end slots 55 for attachment purposes and notches 56 complementing the slots 31 in the block section 1a to complete the wire passages aforementioned. Also the block section 1 has pins 57 and 58 adjacent its opposite ends which fit in depressions in the section 1ᵃ, certain of the pins and their respective depressions being of greater diameter than the other pins and depressions to insure against assembly of the block sections except in the right relation.

As shown in Fig. 1, the block sections are attached to their supporting ears by bolts 59 preferably provided with nuts 59ᵃ and 59ᵇ to afford individually securement of the block sections individually whereby the sections 1ᵃ may, if desired, be removed without loosening the block sections 1.

Referring to Fig. 1, the shaft 2 preferably is of polygonal cross section and as shown carries two like pairs of cams 60—61 to coact with the two rollers 41, and an additional cam 70 for the purpose hereinafter set forth. The cams 60 and 70 are non-rotatable on the shaft 2, being provided with polygonal central openings with which the shaft has a close fit, whereas the cams 61 are rotatably mounted on said shaft. Both cams 60 are of the form clearly shown in Fig. 2, each having therein a slot 62, whereas both cams 61 are of the form best shown in Fig. 3, each having a pin 63 projecting perpendicularly from one face thereof and an orifice 64. In assembling the cams on the shaft the pin 63 of each cam 61 is passed progressively through the orifice 64 in the other cam 61 and the slot 62 in the cam 60 adjacent the latter cam 61, as best shown in Fig. 4. Consequently the coaction of the cams of both sets will be the same, with the same lost motion connection between each pair of cams 60 and 61, and thus it will be apparent that the two sets of cams acting through the rollers 41 will lift the rod or rods 40 and allow it or them to fall without tilting thereof, to control uniformly all switches of each block subjected to the influence of said cams. The two sets of cams 60—61 and the cam 70 are retained in proper positions on the shaft axially of said shaft as by the customary tubular spacers cut to the desired length and slipped onto the shaft sequentially with the cams in making the assembly. The shaft 2 is shown as rotatably mounted in a conventional manner and as having the handle 4 fixed thereto in a known way wherefore these details will not be described, it being understood that the shaft may be rotatably supported in any preferred way and that the handle may be secured to the shaft in any desired way.

The cams 60—61 are respectively provided with relatively deep notches 65 and 66 and while each cam has other peripheral notches said cams through coaction with the rollers 41 raise each of the rods 40 for opening all switches under the influence thereof in all rotary positions of said cams except as the pairs of rollers are permitted motion by alignment therewith of the relatively deep notches of both cams. Then the switches influenced by the rods carrying such rollers are allowed to close under their bias while all other switches which are under the influence of the cams are held open, and as the cams move on they immediately effect opening of the closed switch or switches by forcing their respective rollers onto the higher portions of the cams. Moreover when the cams 60—61 occupy a relation in which the notches 65 and 66 are in registry then regardless of the rotary position of the cams initial movement of the shaft imparts motion to the cams 60 but not to the cams 61 until the lost motion between cams 60 and 61 is taken up. Meanwhile the notches 65 have been moved out of registry with the notches 66, and hence continued rotation of the cams will not permit closing of any switches until the cams 61 are arrested with the notches 65 in alignment with some pair of rollers 41 and until the shaft motion is reversed for reverse movement of the cams 60 sufficient for re-registering of notches 65 and 66. With the notches 65 formed as shown in Fig. 2 and with the limited lost motion shown, the aforementioned return motion of the shaft will be automatic upon release of the handle 4, as a function of the camming action of the rollers 41 under the influence of the biasing means of the switches about to close. Such return movement of the shaft will also be assisted by the camming action of the other rollers in entering the shallower notches of the cams. Here it is to be noted that as shown in Fig. 2, when the notches 65 and 66 are out of alignment with all rollers 41, all rollers 41 enter the shallower notches in said cams, the shallower notches being spaced to align with a multiplicity of said rollers in all operative positions of the drum. Thus the rollers 41 in coaction with the shallower notches of the cams afford star-wheel action for defining the operative and the off positions of the drum and at the same time insure registry of the notches 65 and 66 in the off position of the drum, thereby centering the pins 63 of cams 61 in the slots 62 of cams 60 and assisting as aforestated in bringing about the same relationship of the cam in each operative position of the drum.

Such control of the switches through cams having lost motion affords closure of the switches of the several blocks either in a natural sequence or in any other desired order, always requiring for closure of any group of switches rotation of the shaft first in one direction and then in a reverse direction. Consequently the usual form of indicating dial is not well suited to such a drum. However, the indicating means now to be described is well suited to such drums.

The indicating means illustrated comprises a dial 75 shown in section in Fig. 1 and in elevation in Fig. 12, this dial bearing the usual markings. The dial 75 instead of being fixed to the drum housing has a bearing 76 on a part fixed to the shaft 2 to permit rotary movement of the dial relative to said shaft. On the other hand, the dial 75 has its rotary motion limited by a stop 77 provided on the drum housing, which projects into a wide notch 78 provided in the dial peripherally thereof. Moreover, the dial has bearing against the same interiorly thereof a spring friction disc 79 carried by the shaft 2 and fixed thereto to rotate therewith. Accordingly the dial 75 always tends to rotate with the shaft but slips thereon when it is arrested by engagement of either end wall of its notch 78 with the fixed stop 77. As shown in Fig. 12, the stop 77 in off position of the drum occupies a center position in the notch 78, and assuming the handle to be moved clockwise to any of its running positions as, for example, position 2, the dial moves with the shaft through an angle equal to the lost motion between the cams 60 and 61, incident to the circuit commutation to be effected. Accordingly the handle in order to be brought into registry with the numeral 2 on the dial must be moved to the overthrow position required for the desired circuit commutation. Then when the handle moves counterclockwise as an incident to completing the selected circuit commutation the dial moves counterclockwise with the handle to the position of rest of the handle. The dial thus indicates in the usual manner the position of the drum. Meanwhile the relationship of the notch in the dial and the stop 77 is restored to that shown in Fig. 12, and hence the dial will serve in the same manner to indicate the necessary movement of the handle for any further functional movement of the drum and to indicate properly the position of the drum when the handle comes to rest, whether the handle be moved clockwise to position 3 or position 4, or counterclockwise to position 1, or to off position.

Cam 70, as best shown in Fig. 6, is provided to cooperate with two end switches of two adjacent switch blocks, which switches are to be left free from control by the rods 40 of such blocks. These switches which for reference purposes will be designated as A and B, respectively, are of the same construction as the other switches, but switch A has a shorter plunger than the switch B, for purposes hereinafter set forth. Switches A and B have individual cam engaging rollers 80 and 81, respectively, mounted as shown in Fig. 7, which it will be assumed shows the block of switch A having roller 80. Roller 80 is shown in Fig. 7 as mounted on a short rod 82 having fixed thereto a collar 83 on one side of roller 80 and one of the smaller loose rollers 42 on the other side of roller 80, the collar 83 and roller 42 being of like dimensions and the roller 80 being of the same dimensions as the roller 41 whereby the single roller assemblies will fit the plunger receiving recesses in block 1, as in the case of rollers 41 and their associated rollers 42. As aforeindicated both rollers 80 and 81 are in a coplanar relation with one another and with the cam 70 which in the position shown in Fig. 6 has its peripheral lug 84 in engagement with the roller 80 to open switch A while having its concentric low peripheral surface 85 in registry with the roller 81 to permit switch B to close, said cam also having a concentric high peripheral surface 87. Such position of the cam 70 corresponds to the off position of the drum and as the drum is moved clockwise the cam 70 moves in the same direction to withdraw its lug 84 from engagement with roller 80 which drops onto the high concentric surface 87 of said cam. Switch A is thereby permitted to close due to the shortness of its plunger, and meanwhile switch B has remained closed. However, as the drum goes into its first operative position the lug 84 of cam 70 engages and lifts roller 81 to open switch B, but as will be apparent there is an intermediate position of the cam 70 where both switches are closed. After switch A is closed and switch B is opened continued clockwise rotation of cam 70 permits the roller 81 to drop on to the high concentric surface 87 of the cam, but owing to the length of the plunger of switch B said switch is not permitted to close. Accordingly throughout continued clockwise movement of the cam 70 within a total range of one revolution the switch A remains closed while the switch B remains open. Then upon return of the drum to off position from any operative position, switch B is held open until the cam 70 reaches a position intermediate the first operative position of the drum and off position thereof, whereupon the roller 81 is permitted to drop on to the cam surface 85 for closing switch B, while switch A remains closed, whereas assuming full return of the drum to off position the cam lug 84 lifts roller 80 to open switch A.

Thus as shown in Fig. 13 the switches A and B afford control of the electromagnetic main switch 90 to obtain through the medium thereof low voltage protection and control of said switch 90 such as to enable so-called intermediate position reset of said switch following its deenergization as the result of low voltage. Considering Fig. 13, it will be observed that when both switches A and B are closed circuit may be traced from line L¹ to and through switches A and B in series to and through the operating winding of switch 90 to line L². Then when switch B is opened continued energization of the winding of switch 90 is rendered dependent upon the circuit from line L¹ to and through switch A to and through normally open auxiliary contacts 91 to the winding of said switch 90. Thus if there be a failure of voltage, switch 90 will open and remain open until the drum is moved to a position intermediate the first operative position and the off position to release switch B for reclosure, whereas if the drum be moved to full off position both the energizing circuit and the maintaining circuit of switch 90 will be interrupted by opening of switch A.

Further referring to Fig. 13 which for control of a multispeed alternating current motor shows schematically a drum comprising four sets of switches of five each and use of all such switches, this schematic showing depicts the characteristic of the physical device in having switches A and B in a coplanar relation with one another and with the end switches of the other two sets of switches, thus exemplifying the saving in length of the drum as compared with one lacking provisions for such coplanar relationship of such switches. Also this diagram exemplifies the utility of the aforedescribed electrical connections of certain of the adjacent switches of certain of the switch blocks.

As the circuit diagram of Fig. 13 exemplifies only one of various possible uses of drums of the character set forth, and as the diagram is self-explanatory it appears needless to describe the same in detail. As will be understood from the description of the drum mechanism, movement of the drum to its first operative position effects closure of all switches in row 1 with but momentary closure of switch A for energization of main switch 90. The remaining switches of said row 1 establish connections for the right hand set of primary windings of motor M for a first speed. Movement of the drum to its second operative position opens all of the switches of row 1 except switch A and closes all of the switches of row 2 except switch B, which has been opened and remains open, as earlier explained. Closure of the switches of row 2 establishes connections for the left hand set of the motor primary windings for a second speed. Movement of the drum to its third operative position opens all closed switches of row 2 and closes all switches of row 3 to establish connections for the right hand set of motor primary windings for a third speed. Movement of the drum to its fourth operative position opens all switches of row 3 and closes all switches of row 4 to establish connections for the left hand set of motor primary windings for a fourth speed.

As will be understood, the double cam control of the motor circuit switches may be dispensed with where unnecessary, and the drum may be varied both as to the number of switch blocks and the number of switches in each block according to the circuits to be controlled. Also it will be understood that where reverse motions of the control shaft for effecting circuit commutations becomes unnecessary the ordinary indicating dial may be substituted for the dial shown and described, and that the switches for control of the main switch may be differently incorporated in the drum when it is found advantageous to do so.

Again referring to the switch blocks aforedescribed, both section 1 and 1ᵃ and the plungers are formed of insulating material capable of withstanding such arcing as occurs between the switch contacts. Preferably the sections 1ᵃ and the plungers are formed of "Melmac" which as is well known is a melamine resin, and preferably the contacts are formed of some of the known silver compounds to minimize arcing.

Referring to Fig. 11, the contact wear indicator shown therein comprises a pin 95 reciprocable in an opening provided in the rib 18 of the switch block section 1ᵃ, said pin passing axially through the spring 24 and threading into the contact 14, to be attached thereto after said contact is mounted in the block section 1ᵃ. As will be apparent, as the wear on the contact surfaces increases the pin 95 will descend in the rib 18, and hence its degree of projection from the rib 18 with the switch closed will afford indication of the wear condition of the contacts. Also as will be understood, each contact 14 of each block may be provided with such an indicating pin 95, and as will be apparent the pins 95 must be released from the contacts 14 for withdrawal of said contacts from the switch block sections 1ᵃ in the manner aforedescribed.

What we claim as new and desire to secure by Letters Patent is:

1. In a drum type circuit controller, in combination, a frame, a shaft rotatably supported thereby, a plurality of switches supported by said frame in rows disposed in an arc about said shaft, and operating connections between said switches and said shaft which comprise cams on said shaft, said cams affording through the medium of said shaft by rotary movements thereof operations of said switches row by row in natural sequence or selectively regardless of such sequence.

2. In a drum type circuit controller, in combination, a frame, a shaft rotatably supported thereby, a plurality of switches supported by said frame in rows disposed in an arc about said shaft, and operating connections between said switches and said shaft which comprise cams on said shaft, said cams affording through the medium of said shaft by rotary movements thereof operations of said switches row by row in natural sequence or selectively regardless of such sequence, and said cams necessitating for operation of any group of said switches rotary movement of said shaft first in one direction and then to a lesser degree in a reverse direction.

3. In a drum type circuit controller, in combination, a frame, a shaft rotatably supported thereby, a plurality of switches supported by said frame, a plurality of actuating elements individual to different groups of said switches, said elements being disposed in an arc about said shaft, and cams on said shaft affording through the medium of said shaft by rotary movements thereof operations of said elements in a natural sequence or selectively regardless of such sequence.

4. In a drum type circuit controller, in combination, a frame, a shaft rotatably supported thereby, a plurality of switches supported by said frame, a plurality of actuating elements individual to different groups of said switches, said elements being disposed in an arc about said shaft, and cams on said shaft affording through the medium of said shaft by rotary movements thereof, operations of said elements in a natural sequence or selectively regardless of such sequence, and said cams comprising coacting parts interconnected for limited relative rotary play such that for the aforementioned operation of any one of said elements said shaft must be subjected to rotary movement first in one direction, and then to a lesser degree in a reverse direction.

5. In a drum type circuit controller, in combination, a frame, a shaft rotatably supported thereby, a plurality of switches supported by said frame, a plurality of actuating elements individual to different groups of said switches, said elements being disposed in an arc about said shaft, and cams on said shaft affording through the medium of said shaft by rotary movements thereof operations of said elements in a natural sequence or selectively regardless of such sequence, and said cams comprising coacting parts interconnected for limited relative rotary play such that for the aforementioned operation of any one of said elements said shaft must be subjected to rotary movement first in one direction, and then to a lesser degree in a reverse direction, said elements being biased to bear against said cam parts and to coact therewith to effect automatically the aforementioned lesser reverse movements of said shaft.

6. In a drum type circuit controller, in combination, a frame, a shaft rotatably supported thereby, a plurality of switches having individual plungers for actuation thereof, said switches being supported by said frame in rows disposed in an arc about said shaft and being so supported with their plungers extending toward said shaft in a radial relation thereto, and cam operating means for said switches associated with said shaft for actuation of said switches by rotation of said shaft, each of said rows of switches being carried by a supporting block removably attached to said frame and having attaching means which are readily accessible and which enable its removal individually.

7. In a drum type circuit controller, in combination, a frame, a shaft rotatably supported thereby, a plurality of switches having individual plungers for actuation thereof, said switches being supported by said frame in rows disposed in an arc about said shaft and being so supported with their plungers extending toward said shaft in a radial relation thereto, and cam operating means for said switches associated with said shaft for actuation of said switches by rotation of said shaft, each of said rows of switches being carried by a supporting block removably attached to said frame and having attaching means which are readily accessible and which enable its removal individually, said switch supporting blocks at least in part being in cross section of tapered form for compact assembly about said shaft.

8. In a drum type circuit controller, in combination, a frame, a shaft rotatably supported by said frame, a plurality of switches having individual actuating elements, said switches being supported by said frame in rows disposed in an arc about said shaft, cams carried by said shaft and through the medium of which said switches are operable by rotary movement of said shaft, and means by which certain of said cams are made an actuating medium for a plurality of switches of a single row, such plurality exceeding in number the number of cams acting thereon.

9. In a drum type circuit controller, in combination, a frame, a shaft rotatably supported thereby, a plurality of switches having individual actuating elements, said switches being supported by said frame in rows disposed in an arc about said shaft, and cams carried by said shaft and through the medium of which said switches are operable by rotary movement of said shaft, each of certain of said rows of switches having associated therewith a common actuating element for a group of the switches thereof, which common actuating element is operatively associated with certain of said cams.

10. In a drum type circuit controller, in combination, a frame, a shaft rotatably supported thereby, a plurality of switches having individual actuating elements, said switches being supported by said frame in rows disposed in an arc about said shaft, and cams carried by said shaft and through the medium of which said switches are operable by rotary movement of said shaft, certain of the switches of a single row having means to effect their operation jointly by certain of said cams and another of the switches of the same row having an individual cam on said shaft to afford the last mentioned switch operation independently of the others.

11. In a drum type circuit controller, in combination, a frame, a shaft rotatably supported thereby, a switch block supported by said frame in spaced relation to said shaft, said block comprising a section having at its outer side an open recess, and comprising a second section seating in the open recess of said first section, stationary contacts seated in the recess in said first section to lie within a central recess of said second section and having exposed wiring terminals, a bridging contact movably mounted in said second section and having a biasing spring urging it to engage said stationary contacts, a plunger reciprocably mounted in said first section and engaging said bridging contact, and means including a cam on said shaft to engage and operate said plunger to disengage said bridging contact from said stationary contacts.

12. In a drum type circuit controller, in combination, a frame, a shaft rotatably supported thereby, a switch block supported by said frame in spaced relation to said shaft, said block comprising a section having at its outer side an open recess, and comprising a second section seating in the open recess of said first section, stationary contacts seated in the recess in said first section to lie within a central recess of said second section and having exposed wiring terminals, a bridging contact movably mounted in said second section and having a biasing spring urging it to engage said stationary contacts, a plunger reciprocably mounted in said first section and engaging said bridging contact, and means including a cam on said shaft to engage and operate said plunger to disengage said bridging contact from said stationary contacts, said block together with said plunger providing for the pairs of cooperating surfaces of said contacts separate insulating chambers.

13. In a drum type circuit controller, in combination, a frame, a shaft rotatably supported thereby, a switch block supported by said frame in spaced relation to said shaft, said block comprising a section having at its outer side an open recess, and comprising a second section seating in the open recess of said first section, stationary contacts seated in the recess in said first section to lie within a central recess of said second section and having exposed wiring terminals, a bridging contact movably mounted in said second section and having a biasing spring urging it to engage said stationary contacts, a plunger reciprocably mounted in said first section and engaging said bridging contact, and means including a cam on said shaft to engage and operate said plunger to disengage said bridging contact from said stationary contacts, said block together with said plunger providing for the pairs of cooperating surfaces of said contacts separate insulating chambers, and said second block section and said plunger comprising melamine resin.

14. In a drum type circuit controller, in combination, a frame, a shaft rotatably supported thereby, a switch block supported by said frame in spaced relation to said shaft, said block comprising a section having at its outer side an open recess and said block comprising a second section seating in the open recess of said first section, stationary contacts seated in the recess in said first section to lie within a central recess of said second section and having exposed wiring terminals, a bridging contact movably mounted in said second section and having a biasing spring urging it to engage said stationary contacts, a plunger reciprocably mounted in said first section and engaging said bridging contact, and means including a cam on said shaft to engage and operate said plunger to disengage said bridging contact from said stationary contacts, said block together with said plunger providing for the pairs of cooperating surfaces of said contacts separate insulating chambers, and said second section of said block together with said bridging contact and its biasing spring constituting a self-contained assembly removable from said frame independently of said first section of said block.

15. In a drum type circuit controller, in combination, a frame, a shaft rotatably supported thereby, a switch block of oblong form supported by said frame in spaced and parallel relation to said shaft, said block comprising a first section having on its outer side a longitudinally extending recess and comprising a second section seating in the open recess of said first section, and having a series of recesses aligned longitudinally of said block and shaft, a plurality of pairs of stationary contacts seating in the recess in said first block section in spaced relation such as to bring the several pairs in line with recesses in said second block section, a plurality of bridging contacts movably mounted in different recesses in said second block section and each having a biasing spring urging it to engage a pair of said stationary contacts, a plurality of plungers reciprocably mounted in said first block section, each to engage one of said bridging contacts, and means including cams on said shaft to engage and operate said plungers to move said bridging contacts against said bias.

16. In a drum type circuit controller, in combination, a frame, a shaft rotatably supported thereby, a switch block of oblong form supported by said frame in spaced and parallel relation to said shaft, said block comprising a first section having on its outer side a longitudinally extending recess, and comprising a second section seating in the open recess of said first section and having a series of recesses aligned longitudinally of said block and shaft, a plurality of pairs of stationary contacts seating in the recess in said first block section in spaced relation such as to bring the several pairs in line with recesses in said second block section, a plurality of bridging contacts movably mounted in different recesses in said second block section and each having a biasing spring urging it to engage a pair of said stationary contacts, a plurality of plungers reciprocably mounted in said first block section, each to engage one of said bridging contacts, and means including cams on said shaft to engage and operate said plungers to move said bridging contacts against said bias, said block together with said plungers providing for each pair of cooperating surfaces of said contacts a separate insulating chamber.

17. In a drum type circuit controller, in combination, a frame, a shaft rotatably supported thereby, a switch block of oblong form supported by said frame in spaced and parallel relation to said shaft, said block comprising a first section having on its outer side a longitudinally extending recess and comprising a second section seating in the open recess of said first section, and having a series of recesses aligned longitudinally of said block and shaft, a plurality of pairs of stationary contacts seating in the recess in said first block section in spaced relation such as to bring the several pairs in line with recesses in said second block section, a plurality of bridging contacts movably mounted in different recesses in said second block section and each having a biasing spring urging it to engage a pair of said stationary contacts, a plurality of plungers reciprocably mounted in said first block section, each to engage one of said bridging contacts, and means including cams on said shaft to engage and operate said plungers to move said bridging contacts against said bias, said block together with said plungers providing for each pair of cooperating surfaces of said contacts a separate insulating chamber, and said second block section together with said bridging contacts and their springs constituting a self-contained assembly removable from said frame independently of said first block section.

18. In a drum type circuit controller, in combination, a frame, a shaft rotatably supported thereby, a switch block of attenuated form supported by said frame in a spaced and parallel relation to said shaft, said block comprising a first section having on its outer side a longitudinally extending open recess and said block comprising a second section seating in the open recess of said first section and having a series of recesses aligned longitudinally of said block, a plurality of pairs of stationary contacts seating in the recess in said first block section in spaced relation such as to bring the several pairs in line with the recesses in said second block section, a plurality of bridging contacts movably mounted in different recesses in said second block section and each having a biasing spring urging it to engage a pair of said stationary contacts, a plurality of plungers reciprocably mounted in said first section of said block, each to engage one of said bridging contacts, and means including cams on said shaft to engage and operate said plungers to move said bridging contacts against their spring bias, said means further including a spindle engaging a number of said contact actuating plungers and also engaging certain of said cams on said shaft, said spindle being confined in said first section of said block with freedom of movement therein to serve as an operating medium for said plungers.

19. A switch block for drum controllers comprising a block of attenuated form divided longitudinally into a base section and a top section, the base section having a face thereof longitudinally recessed for seating therein the top section, and the top section having therein in alignment longitudinally thereof a series of recesses, pairs of stationary contacts seated in the recess of said base block section and having extensions extending between the block sections to the outside of the block and affording wiring terminals, said pairs of contacts being spaced for locating the same in different recesses in the top section, bridging contacts movably mounted in the recesses in the top section, springs in the recesses in the top section biasing said bridging contacts to engage their respective stationary contacts, and plungers reciprocably mounted in said base section for engagement with and actuation of said bridging contacts, said block and said plungers providing for each pair of cooperating faces of said contacts an insulating chamber closed on all four sides and at least at one end.

20. A switch block for drum controllers comprising a block of attenuated form divided longitudinally into a base section and a top section, the base section having a face thereof longitudinally recessed for seating therewith the top section, and the top section having therein in alignment longitudinally thereof a series of recesses, pairs of stationary contacts seated in the recess of said base block section and having extensions extending between the block sections to the outside of the block and affording wiring terminals, said pairs of contacts being spaced for locating the same in different recesses in the top section, bridging contacts movably mounted in the recesses in the top section, springs in the recesses in the top section biasing said bridging contacts to engage their respective stationary contacts, and plungers reciprocably mounted in said base section for engagement with and actuation of said bridging contacts, said block and said plungers providing for each pair of cooperating faces of said contacts a separate insulating chamber, and said block having conductor passages extending therethrough at points between said chambers.

21. A switch block for drum controllers comprising a block of attenuated form divided longitudinally into a base section and a top section, the top section having therein in alignment longitudinally thereof a series of recesses, pairs of stationary contacts seated in said base section and having extensions extending between the block sections to the outside of the block and affording wiring terminals, said pairs of contacts being spaced for locating the same in different recesses in the top section and for retention being wedged into sockets in said base section, bridging contacts movably mounted in the recesses in the top section, springs in the recesses in the top section biasing said bridging contacts to engage their respective stationary contacts and to engage retaining shoulders in said top section from which said contacts may be disengaged by manipulation for removal, and plungers reciprocably mounted in said base section for engagement with and actuation of said bridging contacts, said block and said plungers providing for each pair of cooperating faces of said contacts a separate insulating chamber, and said block sections together with their respective contacts constituting self-contained assemblies.

22. In a drum type controller for commutating a circuit having an electroresponsive main switch, in combination, a frame, a shaft rotatably supported thereby, switches mounted on said frame in rows paralleling said shaft, means including cams on said shaft to operate certain of said switches for commutating connections completed through the main switch and to operate other of said switches to control the main switch, the last mentioned switches being in respect of the longitudinal axis of said shaft in a transverse coplanar relation to certain of the other of said switches aforementioned.

23. In a drum type controller for commutating a circuit having an electroresponsive main switch, in combination, a frame, a shaft rotatably supported thereby, switches mounted on said frame in rows paralleling said shaft, means including cams on said shaft to operate certain of said switches for commutating connections completed through the main switch and to operate other of said switches to control the main switch, the last mentioned switches being in respect of the longitudinal axis of said shaft in a transverse coplanar relation to certain of the other of said switches aforementioned, said switches which control the main switch being in a coplanar relation to be operated by a cam common thereto, which cam in the off position of the drum effects opening of one of the last mentioned switches and closing of another thereof and upon movement of the drum from off position to its first on position effects closure of said open switch and opening of said switch closed in the off position, meanwhile providing for closure of both of said switches.

24. In a drum type controller, in combination, a frame, a shaft rotatably supported thereby, switches mounted on said frame, means including cams on said shaft to operate said switches through the medium of said shaft, said shaft whenever operated for circuit change requiring a given degree of reverse movement to perfect the change and a position indicator comprising parts movable relatively upon rotary movement of said shaft to effect a circuit change, one of said parts being fixed to said shaft and another being stationary except for a limited play and being coordinated with said shaft to move therewith in either direction between the limits of the aforementioned play.

25. In a drum type controller, in combination, a frame, a shaft rotatably supported thereby, a switch block fixed to said frame in spaced relation to said shaft, a switch in said switch block comprising stationary contacts, and a movable bridging contact, said bridging contact carrying a wear indicating pin extending outwardly of said block, and operative connections between said shaft and said bridging contact including a cam on said shaft and a plunger operatively associated with said bridging contact and operable by said cam.

RICHARD B. HUNTER.
HAROLD L. MEKELBURG.

REFERENCES CITED

The following references are of record in the file of this patent:

UNITED STATES PATENTS

| Number | Name | Date |
| --- | --- | --- |
| 1,126,455 | Hansen | Jan. 26, 1915 |
| 1,781,178 | Hewlett et al. | Nov. 11, 1930 |
| 1,794,193 | McKerlie | Feb. 24, 1931 |
| 2,245,369 | Smith | June 10, 1941 |